United States Patent [19]

Stermole et al.

[11] 4,428,919
[45] Jan. 31, 1984

[54] METHOD FOR SEPARATING PARTICULATE CALCIUM HYPOCHLORITE AND SODIUM CHLORIDE

[75] Inventors: David A. Stermole, Bedford Heights; Clifford E. Loehr, Norton; Duk S. Chun, Uniontown, all of Ohio

[73] Assignee: PPG Industries, Inc., Pittsburgh, Pa.

[21] Appl. No.: 374,130

[22] Filed: May 3, 1982

[51] Int. Cl.$^3$ ............................................ C01B 11/06
[52] U.S. Cl. .................................... 423/474; 423/499
[58] Field of Search ............... 423/474, 499; 422/252; 209/158–161

[56] References Cited

U.S. PATENT DOCUMENTS

| | | | |
|---|---|---|---|
| 1,937,190 | 11/1933 | Chance | 209/161 |
| 3,237,767 | 3/1966 | Fowle | 209/160 |
| 3,251,647 | 5/1966 | Nicolaisen | 423/474 |
| 3,767,775 | 10/1973 | Tatara et al. | 423/474 |
| 3,950,499 | 4/1976 | Miyashin et al. | 423/474 |
| 4,258,024 | 3/1981 | Hoffer et al. | 423/474 |
| 4,328,200 | 5/1982 | Welch | 423/474 |

OTHER PUBLICATIONS

Lauer, *Chemical Engineering Techniques*, Reinhold Pub. Corp., N.Y. (1952), pp. 146–149.

*Primary Examiner*—Earl C. Thomas
*Attorney, Agent, or Firm*—Irwin M. Stein

[57] ABSTRACT

Calcium hypochlorite particles and larger separable sodium chloride crystals produced in a process for manufacturing calcium hypochlorite are effectively separated by use of a staged upward-flow elutriator-classifier. In particular, an aqueous slurry of the calcium hypochlorite particles and sodium chloride crystals are introduced into about the midpoint of the classifier and elutriated with fluid substantially saturated in calcium hypochlorite and sodium chloride. A first slurry in which the solid phase is predominantly calcium hypochlorite, e.g., at least 95 weight percent, is removed as overflow from the top of the classifier, and a second slurry in which the solid phase is predominantly sodium chloride is removed as underflow from the bottom of the classifier.

In one embodiment, the first slurry is separated into a wet cake of calcium hypochlorite and bleach mother liquor, a portion of which liquor is used as elutriating fluid. The second slurry is separated into a wet cake of sodium chloride and salt mother liquor, which liquor is recycled to the bottom of the classifier. The wet cake of sodium chloride is washed with a fluid unsaturated in calcium hypochlorite and the washed sodium chloride recovered.

15 Claims, 1 Drawing Figure

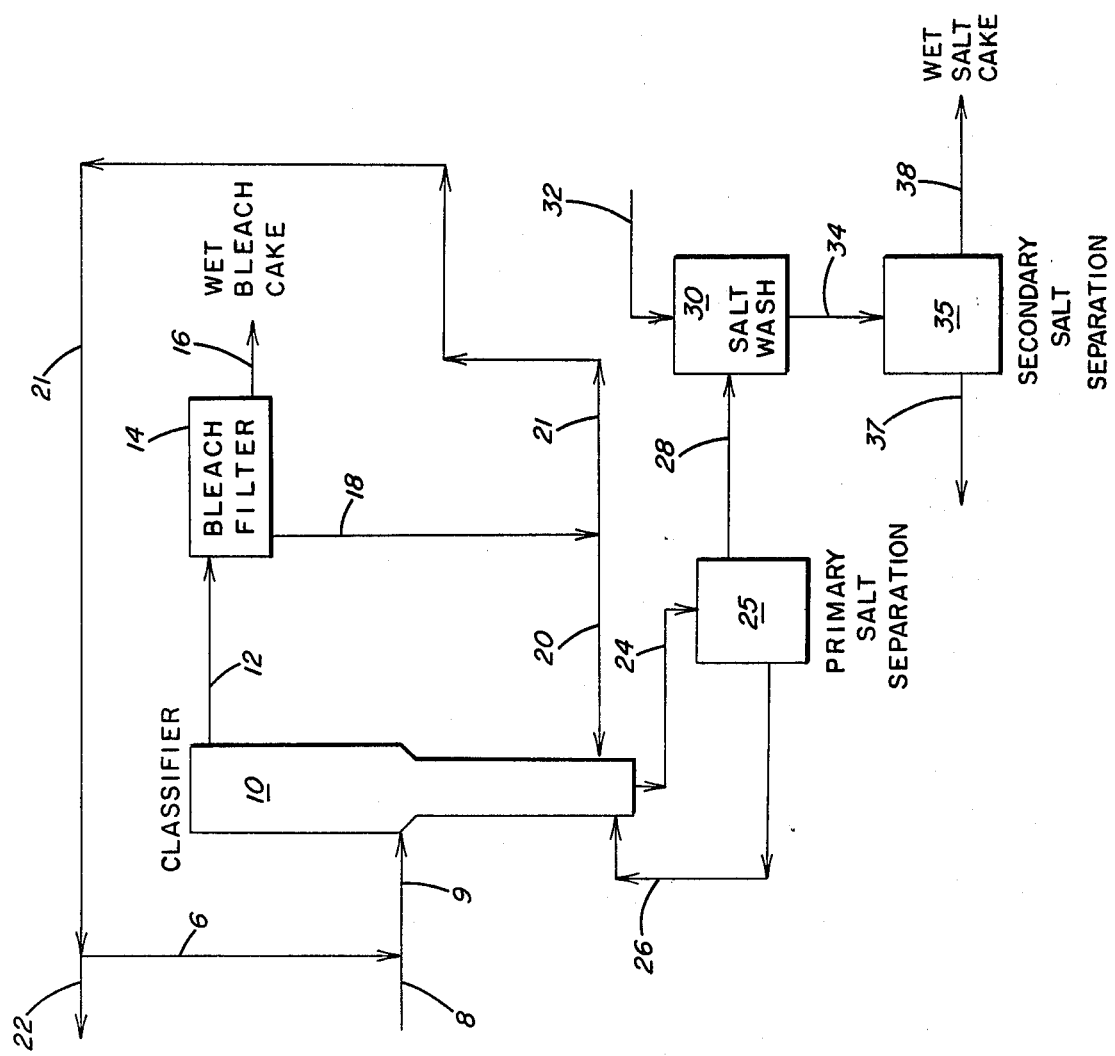

METHOD FOR SEPARATING PARTICULATE CALCIUM HYPOCHLORITE AND SODIUM CHLORIDE

DESCRIPTION OF THE INVENTION

The present invention relates to the manufacture of neutral calcium hypochlorite, which is commonly referred to as "bleach." Aside from chlorine, calcium hypochlorite enjoys a major portion of the market for available chlorine compounds because it is the cheapest and most stable solid composition known which delivers all of its available chlorine immediately on contact with oxidizable materials. Calcium hypochlorite compositions containing at least 65 percent of available chlorine have been on the market for many years and are used primarily as a commercial bleaching and sanitizing agent, particularly in the disinfection of swimming pool waters.

A variety of processes for manufacturing calcium hypochlorite have been proposed. In some, an aqueous slurry of calcium hypochlorite particles and sodium chloride crystals are simultaneously produced in an aqueous reaction mixture. In order to produce a calcium hypochlorite of high purity and high available chlorine content, it is necessary to effectively separate the calcium hypochlorite particles from the sodium chloride crystals admixed therewith. Otherwise, a calcium hypochlorite product having an available chlorine content less than the desired commerical value, e.g., 65 percent, will be obtained.

Among the methods suggested for separating crystals of sodium chloride from particles of calcium hypochlorite are flotation, decantation, hydrocloning, and ascending flow classification in a cylindrical classifier. See, for example, in U.S. Pat. Nos. 4,258,024 and 3,767,775. The technique of particle size classification by flotation is technically involved and has the added cost of the foam-producing reagent. The techniques of decantation and ascending flow classification with piston flow have the disadvantage of removing more than an insignificant quantity of calcium hypochlorite along with the heavier sodium chloride crystals.

It has now been discovered that an effective separation of calcium hypochlorite particles and larger sodium chloride crystals can be achieved by the use of a staged upward-flow elutriator-classifier. In particular, it has been found that such separation can be achieved by introducing an aqueous slurry of calcium hypochlorite particles and larger sodium chloride crystals into about the midpoint of a classification zone comprising a staged upward-flow substantially vertical elutriator-classifier. Elutriating fluid comprising an aqueous solution substantially saturated with calcium hypochlorite and sodium chloride is introduced into the lowermost stage of the elutriator-classifier in order to separate calcium hypochlorite particles associated with the descending crystals of sodium chloride.

A first slurry in which the solid phase is predominantly calcium hypochlorite particles is removed from the upper portion of the uppermost stage of the classification zone, and a slurry in which the solid phase is predominantly sodium chloride crystals is removed from the lower portion or bottom of the lowermost stage of the classification zone. The first slurry is forwarded to solid-liquid separating means to produce a wet cake of calcium hypochlorite solids and bleach mother liquor.

The sodium chloride-rich slurry removed from the classification zone is forwarded to primary liquid-solid separating means, thereby to produce sodium chloride (salt) mother liquor and a first wet salt cake. The first wet salt cake is washed with aqueous wash liquor that is unsaturated in calcium hypochlorite, thereby to dissolve substantially all of the solid calcium hypochlorite entrained in the sodium chloride-rich slurry removed from the lowermost stage of the classification zone. A slurry in which the solid phase is predominantly washed sodium chloride is forwarded to secondary solid-liquid separating means wherein the washed sodium chloride is separated from the calcium hypochlorite-enriched wash liquor.

In a preferred embodiment, bleach mother liquor is used as elutriating fluid in the classification zone. Further, salt mother liquor can be recycled to the classification zone for use as carrier liquor for removing sodium chloride-rich slurry from the lowermost stage of the classification zone.

BRIEF DESCRIPTION OF THE DRAWING

The specific features and advantages of the present invention will become more clear from the following detailed description made with reference to the drawing, which is a schematic flow diagram of a preferred embodiment of the present invention.

DETAILED DESCRIPTION OF THE INVENTION

Referring to the drawing, there is shown flow lines 8 and 9 for transporting an aqueous slurry of calcium hypochlorite particles and larger separable sodium chloride crystals from an upstream stage of a calcium hypochlorite manufacturing process (now shown) wherein such slurry is produced, e.g., a chlorination zone. The separation process described herein is particularly applicable to the calcium hypochlorite manufacturing process described in co-pending, coassigned U.S. patent application, Ser. No. 269,241 filed June 1, 1981. In that process, dibasic calcium hypochlorite is chlorinated to produce the aforesaid aqueous slurry of calcium hypochlorite particles and readily separable, larger sodium chloride crystals. Typically, flow line 8 contains from about 16 to about 25 weight percent solids, more typically, between about 18 and 20 weight percent solids, the predominant portion of such solids being particles of calcium hypochlorite and sodium chloride crystals.

The particles of calcium hypochlorite found in the aforesaid aqueous slurry prepared in accordance with the process of the aforedescribed U.S. patent application, Ser. No. 269,241, are typically agglomerates of smaller calcium hypochlorite crystals. These particles typically have a weight mean average particle size of between about 50 and 120 microns, more typically between about 80 and 100 microns. The weight mean average particle size of the sodium chloride crystals in the aforesaid aqueous slurry prepared by said described process is typically greater than 150, e.g., greater than 170 microns. More typically, the weight mean average particle size of the sodium chloride crystals is between about 170 and 350 microns.

The specific weight mean average particle size of calcium hypochlorite particles and sodium chloride crystals will depend on the particular calcium hypochlorite manufacturing process. Generally, the sodium chloride crystals are significantly larger than the calcium hypochlorite particles and are sufficiently larger so that a separation method which utilizes the difference is size and/or bulk density of the calcium hypochlorite particles and sodium chloride crystals can be used. Such larger sodium chloride crystals are readily separable from the smaller calcium hypochlorite particles by gravity classification, and, as used herein, the term "separable," "readily separable," or like terms are intended to refer to sodium chloride crystals of that size.

The weight mean average particle size of the larger separable sodium chloride crystals is typically at least 60, e.g., 80, more typically at least 100, microns larger than the weight mean average particle size of the calcium hypochlorite particles. In a preferred embodiment, the weight mean size differential between the calcium hypochlorite particles and sodium chloride crystals is greater than 200 and, more preferably, greater than 280 microns. In the calcium hypochlorite manufacturing process described in coassigned U.S. patent application, Ser. No. 350,653, filed Feb. 22, 1982, the aforesaid weight mean size differential ranges between 80 and 370, e.g., between 250 and 320, microns.

In the event that the solids content of the slurry in flow line 8 is too high, or in the event of a turn-down of the calcium hypochlorite manufacturing process, an aqueous solution saturated with calcium hypochlorite and sodium chloride, e.g., recycle bleach mother liquor, can be admixed with flow line 8 by means of flow line 6. The amount of bleach mother liquor so admixed will depend on the solids content desired to be introduced into classification zone 10 and/or the amount of total liquid required to be introduced therein for proper operation of the classifier. As described, the solids content in flow line 9 typically ranges from 16 to 25 weight percent.

A first slurry in which the solid phase is predominantly calcium hypochlorite particles is removed from the upper portion of the uppermost stage of classification zone 10 and forwarded by means of flow line 12 to solid-liquid separating means, e.g., bleach filter 14. In filter 14, slurry containing particulate calcium hypochlorite is separated into a wet cake of calcium hypochlorite and bleach mother liquor. The calcium hypochlorite wet cake and bleach mother liquor are removed from bleach filter 14 by flow lines 16 and 18 respectively.

A second slurry in which the solid phase is predominantly sodium chloride crystals is removed from the lower portion of the lowermost or bottom stage of classification zone 10 by means of flow line 24. This second slurry is forwarded to primary liquid-solid separating means 25, e.g., a centrifuge, in which the second slurry is separated into a first wet cake of sodium chloride solids and salt mother liquor. In a preferred embodiment, salt mother liquor is recycled from separating means 25 to the bottom stage of classification zone 10 by flow line 26 wherein it serves as carrier liquor for removing second slurry from classification zone 10.

As salt mother liquor (flow line 26) and bleach mother liquor (flow line 18) are both substantially saturated with calcium hypochlorite and sodium chloride, various alternative piping arrangements for use of such liquors are contemplated. For example, salt mother liquor can be substituted for all or a part of the bleach mother liquor used as elutriating fluid (flow line 20) in classification zone 10 or for all or part of the aqueous feed slurry diluting liquor (flow line 6). In a further embodiment, salt mother liquor (flow line 26) and bleach mother liquor (flow line 20) entering the lower stage of classification zone 10 can be combined, and the combined mother liquors introduced into the lower stage of classification zone 10. The amount of combined mother liquor so introduced which functions as elutriating fluid within the classification zone can be regulated by controlling the rates of the liquid streams introduced to and removed from the classification zone, particularly the flow rate of salt slurry removed from the bottom of the classifier.

When salt mother liquor is substituted for all or part of the bleach mother liquor in the described process, bleach mother liquor can be used in place of the salt mother liquor, i.e., the roles of the salt mother liquor and bleach mother liquor will be reversed to the extent of the amount of substitution. In all cases, the volume of liquor handled by the aforesaid flow lines are balanced to insure proper operation of the elutriater classifier and the primary salt separator 25.

Bleach mother liquor removed from bleach filter means 14 is forwarded by flow line 18 and 20 to the bottom stage of classification zone 10 as elutriating fluid. A portion of this elutriating fluid may also be removed with the second slurry by means of flow line 24, thereby also serving as carrier fluid for the second slurry. The elutriating fluid introduced into the classification zone can be introduced at any level in the bottom stage, but is usually introduced in the lower portion of the bottom stage. In the latter embodiment, the elutriating fluid is usually introduced at a level which is above or below, e.g., from 0.1 to 3 column diameters above or below, or at the same level as the withdrawal point of the second slurry, i.e., the salt slurry. Advantageously, elutriating fluid is introduced at a level above the carrier fluid entry point to avoid short circuiting of elutriating fluid to the exiting salt slurry.

The amount of elutriating fluid introduced into the classifier is that amount which is sufficient to separate from the countercurrently descending larger sodium chloride crystals the smaller calcium hypochlorite particles associated therewith and wash upwardly such separated calcium hypochlorite particles. The elutriating fluid maintains the calcium hypochloride particles in suspension in the upper stage(s) of the classifier until such particles are removed with the overflow (flow line 12) therefrom. The rate of upward flow of the elutriating fluid is less than the rate which exerts a force that will maintain the larger downwardly flowing sodium chloride crystals in suspension, thereby impeding their descent, or carry upwardly significant amounts of such crystals. The upflow velocity of elutriating fluid required to maintain the aforedescribed balance and effectuate the separation of calcium hypochlorite particles from sodium chloride crystals can vary and is a function of the average particle size of the aforesaid particles and crystals. The required velocity also in part determines the volume of elutriating fluid used. As later discussed, the upflow velocity can be determined by the application of Stoke's Law.

The upflow fluid velocity within the classifier will depend on the weight mean average size of the sodium chloride crystals charged thereto. The upflow velocity should be such that at least 85 percent of the suspended calcium hypochlorite particles are entrained and carried out as overflow effluent while the heavier and larger salt crystals are allowed to settle by gravity into the lower stage. The larger the size of the salt crystals, the higher the velocity that can be used. For example, when the weight mean average salt size is in the range of from 180–250 microns, an upward fluid velocity of about 0.06 centimeters/second is suitable. When the weight mean average particle size of the salt is greater than 250 microns, the upward fluid velocity can be in the range of 0.1–0.4 centimeters/second. The upflow fluid velocity can be calculated based on a determination of the settling velocity of the sodium chloride crystals using Stoke's Law. The elutriator-classifiers are designed and operated to provide constant upflow velocities within the above range.

The design and operation of classification zone 10 should be such that at least 85 and preferably at least 90 percent of the calcium hypochlorite particles introduced therein are removed with the first slurry, i.e., the overflow from classifier 10. This slurry will also contain a small amount of the very small sodium chloride crystals. Thus, this first slurry will contain less than about 5.0, e.g., less than 2.5 weight percent of solid sodium chloride crystals. The specific design of the elutriator-classifier will depend on the aqueous slurry feed rate, the absolute size of the average calcium hypochlorite particles and sodium chloride crystals and the size differential between said particles and crystals; however, such classifiers can be designed and constructed utilizing well-known engineering principles.

The upward fluid velocity in the upper and lower stages of the elutriator-classifier can be about the same; however, due to its smaller diameter, the velocity in the bottom stage often is slightly higher. The upward fluid velocity can be regulated by the amount of elutriating and carrier liquor introduced into the lower stage of the classifier and the salt slurry withdrawal rate. The elutriating fluid washes the settling sodium chloride crystals of adhering calcium hypochlorite and also washes upwardly calcium hypochlorite particles that may be drawn downwardly into the lower stage of the elutriator-classifier from the feed point.

Bleach mother liquor that is not recycled to classification zone 10 by means of flow line 20 can be recycled by means of flow line 21 to a different stage, e.g., an earlier stage, of the calcium hypochlorite manufacturing process because of the high calcium hypochlorite content of this stream. When a portion of the bleach mother liquor recycled through flow line 21 is also diverted through flow line 6 to dilute aqueous feed slurry carried by flow line 8, the remaining bleach mother liquor is carried by means of flow line 22 to a different stage of the calcium hypochlorite manufacturing process.

Wet calcium hypochlorite filter cake is removed from filter means 14 via flow line 16 and dried. Moist cake from filter means 14 contains from about 45 to about 55 percent by weight of calcium hypochlorite, from about 6 to about 12 percent by weight of sodium chloride (liquid plus solid), and from about 30 to about 40 percent by weight of water. This moist cake can be used directly in the treatment of water systems, such as swimming pools and the like; but, is generally dried and stored prior to use. The moist cake is dried by conventional known means, for example, using a turbo dryer, fluid bed dryer, or vacuum dryer in a known manner where appropriate temperature ranges are employed to quickly reduce the water content of the wet filter cake to the desired level.

The neutral calcium hypochlorite-containing moist cake is usually dried with hot, e.g., 330°–350° F. (166°–177° C.), dry air while maintaining the product temperature in the range of from about 60° F. (15.6° C.) to about 180° F. (82° C.) and preferably from about 75° F. (24° C.) to about 120° F. (49° C.) to give a calcium hypochlorite product having at least 65 weight percent available chlorine (as calcium hypochlorite) and a water content of from about 2 to about 12 percent by weight, the bulk of the remaining contents being sodium chloride.

The first wet salt cake produced in liquid-solid separating means 25, e.g., a salt centrifuge, is forwarded by flow line 28 to a suitable wash vessel 30. There, the first salt cake is washed with aqueous wash liquor which is unsaturated in calcium hypochlorite. Preferably, the wash liquor is substantially saturated with sodium chloride. The wash liquor can be water; however, it is preferred that the wash liquor be an aqueous fluid obtained from another stage of the calcium hypochlorite manufacturing process. In that embodiment, the wash liquor will contain dissolved calcium hypochlorite, sodium chloride and minor amounts of other salts indigenous to the calcium hypochlorite manufacturing process, e.g., calcium chloride, calcium chlorate, and calcium hydroxide. The degree of unsaturation of the aqueous wash liquor with respect to calcium hypochlorite should be such that the wash liquor is sufficient to redissolve at the temperature of operation substantially all of the calcium hypochlorite solids present in the first wet salt cake, thereby producing a relatively pure sodium chloride, i.e. sodium chloride substantially free of solid calcium hypochlorite. In particular, the aqueous wash liquor should be capable of dissolving sufficient of the retained calcium hypochlorite solids so that the second or final wet salt cake (flow line 38) contains less than one, e.g., less than 0.5, weight percent, and preferably no calcium hypochlorite solids.

In one embodiment of the present process, the first wet salt cake is slurried in a suitable wash vessel 30 with wash liquor admitted thereto by means of flow line 32. The resulting slurry of washed sodium chloride crystals is forwarded by flow line 34 to secondary liquid-solid separating means 35, e.g., a further salt centrifuge or filter, whereby the washed sodium chloride solids are separated into a second or final wet salt cake and calcium hypochlorite-enriched wash liquor, which liquor is removed from separating means 35 by flow line 37.

Any suitable apparatus for washing the first wet salt cake can be used. In addition to a wash vessel in which the first wet salt cake is slurried with the wash liquor, there is also contemplated use of washing columns in which the first wet salt cake is continuously introduced at the top of an essentially cylindrical column and countercurrently washed with the wash liquor. A slurry of washed salt is removed from the bottom of the column and the wash liquor is removed from the top of the column.

The elutriator-classifier described herein as the classification zone is a gravity classifier of the up-flow type, i.e., a classifier operating by an elutriation/sedimentation technique. In such a classifier, the calcium hypochlorite particles are suspended in mother liquor present in the upper portion of the classifier while a bed of sodium chloride crystals is formed and maintained in the lower portion of the classifier by the countercurrently settling larger and heavier salt crystals. The classifier is staged, i.e., contain two or more stages. The diameter of the respective stages increase in ascending order, i.e., in the direction of calcium hypochlorite slurry flow. While a classifier having two stages is shown in the drawing, a classifier having more than two stages, e.g., three or four, are contemplated.

The two stage classifier shown in the drawing is a substantially vertical, essentially cylindrical column in which the diameter of the upper stage is larger than the diameter of the bottom stage. The length to diameter (L/D) ratio of the upper stage is at least 2:1 while the L/D ratio of the lower stage is at least 5:1. The L/D ratio of the upper stage can range from 2:1-15:1 while the L/D ratio of the bottom stage can vary from about 5:1 to about 40:1. For purposes of piston or plug flow, L/D ratios of at least 10:1 and preferably at least 12:1 are recommended. The height of the upper stage is typically larger than the height of the lower stage but the stages can be of equal height. The height of each stage is measured by the height of the straight cylindrical portion of each stage without taking into account the necked-down portion of the classifier which connects the upper and lower stages.

The classifier can contain an agitator in the upper stage. The agitator contains at least one and preferably at least three to six blades at various levels in the upper stage. The agitators are operated at relatively slow speeds, e.g., 1 to 20 rpm, in order to prevent channeling of the slurry flowing upwardly through the upper stage and avoid breaking of the particulate solids therein.

The slurry feed (flow line 9) to the elutriator-classifier is introduced therein at about the midpoint of the classifier. In a classifier with two stages, the feed is introduced at the bottom of the upper stage, i.e., at the top of the transition section between the upper and lower stage of the classifier. The feed is distributed within the classifier evenly by means of a nozzle which distributes the aqueous slurry in all directions within the column. Use of such nozzle avoids initial preferential directional flow of the aqueous slurry feed within the classifier.

Solids content of the first slurry overflow from the upper stage of the elutriator-classifier will commonly range between about 8 and about 12 weight percent, e.g., about 10 weight percent. Solids content of the second (salt) slurry removed from the lower stage of the classifier and introduced into the primary liquid-solid separating means 25 will commonly range between about 5 and 20, e.g., 17-18 weight percent.

While bleach filter liquor is shown as the elutriating fluid in the drawing, any other suitable fluid from the manufacturing process, i.e., fluid which is substantially saturated in calcium hypochlorite and sodium chloride, can be used (as heretofore described) as the elutriating fluid. Such solutions may be available from other portions of the manufacturing process; however, bleach filter mother liquor or salt mother liquor is most convenient and is, therefore, preferred.

Similarly, although filter means and centrifuge means are indicated in the drawing and specification as the separating means used to separate solid calcium hypochlorite and solid sodium chloride respectively from their mother liquors, any solid-liquid separating means suitable for the materials handled can be used. Exemplification of such separating means include centrifuges, plate and frame filters, high pressure expression equipment, such as a tube filter press, piston filter press or membrane filter, or other analogous solid-liquid separating means.

Calcium hypochlorite solids (wet bleach cake) separated in accordance with the present process have been found to contain less than 2, e.g., 1 to 2, weight percent solid sodium chloride. Similarly, the final wet sodium chloride salt cake (flow line 38) recovered utilizing the present process has been found to contain less than one weight percent solid calcium hypochlorite.

The present invention is more particularly described in the following Example which is intended as illustrative only since numerous modifications and variations therein will be apparent to those skilled in the art. In the Example, all percentages are by weight unless noted otherwise. Flow rates and other values are average values reflecting normal fluctuation in a continuous process.

EXAMPLE 350 grams per minute (g/min) of an aqueous slurry feed stream containing about 10 weight percent calcium hypochlorite particles and about 7 weight percent sodium chloride crystals were charged to a classification zone comprising a two-stage upward flow cylindrical elutriator-classifier. The weight mean average particle size of the calcium hypochlorite particles and sodium chloride crystals were 90 and 300 microns respectively. The diameters of the upper and lower stages of the elutriator-classifier were 3.8 and 1.28 inches (9.6 and 3.25 cm.) respectively. The height of the upper and lower stages were 4.5 and 1.5 feet (137 and 46 cm.) respectively. The aqueous feed slurry was introduced into the classifier at about its midpoint.

70 grams per minute of elutriating fluid comprising an aqueous solution saturated with calcium hypochlorite and sodium chloride (bleach mother liquor) was introduced into the bottom portion of the lower stage of the classifier. The upward fluid velocities within the lower and upper stages of the classifier were calculated to be 0.06 and 0.12 centimeters per second respectively.

390 grams per minute of an aqueous slurry containing about 10 weight percent solids, 94 percent of which solids were calcium hypochlorite, were withdrawn from the upper portion of the upper stage of the classifier and forwarded to a bleach filter. Simultaneously, 150 g/min of an aqueous slurry containing about 17 weight percent solids, 84 percent of which solids were sodium chloride crystals, were removed from the bottom of the lower stage of the classifier and forwarded to a primary salt centrifuge.

The slurry of sodium chloride crystals was separated into a first wet salt cake and salt mother liquor in the primary salt centrifuge. 120 g/min of salt mother liquor was introduced as carrier liquor to the bottom portion of the elutriator-classifier. 25 g/min of first salt cake which contained about 80 weight percent sodium chloride solids and 8 weight percent calcium hypochlorite solids was slurried with 200 g/min of an aqueous wash liquor containing about 20.5 weight percent sodium chloride and 3.6 weight percent calcium hypochlorite. The resulting sodium chloride slurry was forwarded to a secondary centrifuge and the washed sodium chloride separated from the wash liquor. The resulting wash liquor contained about 5.5 weight percent calcium hypochlorite.

The aforesaid process was conducted for 399 hours. The wet bleach cake was found to contain about 7 weight percent sodium chloride. 0.8 weight percent of the wet bleach cake was solid sodium chloride. The wet cake of washed sodium chloride was found to contain about 1.2 weight percent calcium hypochlorite. About 0.6 weight percent of the wet salt cake was solid calcium hypochlorite.

Although the present process has been described with reference to specific details of certain embodiments thereof, it is not intended that such details should be regarded as limitations upon the scope of the invention except as and to the extent that they are included in the accompanying claims.

What is claimed is:

1. In the process of producing calcium hypochlorite wherein an aqueous slurry of calcium hypochlorite particles and larger separable sodium chloride crystals is produced and wherein the particles of calcium hypochlorite and crystals of sodium chloride are separated, the improvement which comprises:
    (a) introducing aqueous slurry containing such calcium hypochlorite particles and larger sodium chloride crystals into a staged upward flow elutriator-classifier at about the midpoint of such classifier, said aqueous slurry being introduced into said classifier in a manner such that an initial preferential directional flow of said slurry is avoided, the uppermost stage of said classifier having a larger diameter than the lowermost stage and the upward fluid velocity in the lowermost stage being higher than the upward fluid velocity in the uppermost stage,
    (b) introducing elutriating fluid comprising an aqueous solution substantially saturated with calcium hypochlorite and sodium chloride into the lowermost stage of said classifier,
    (c) removing a first slurry in which the solid phase is predominantly calcium hypochlorite particles from the uppermost stage of said classifier,
    (d) separating said first slurry into a wet cake of calcium hypochlorite solids and bleach mother liquor,
    (e) removing from the lowermost stage of said classifier a second slurry in which the solid phase is predominantly sodium chloride crystals,
    (f) separating said second slurry into a wet cake of sodium chloride solids and salt mother liquor,
    (g) washing said wet cake of sodium chloride solids with an aqueous wash liquor unsaturated in calcium hypochlorite, thereby to dissolve substantially all of the calcium hypochlorite solids present in said wet cake, and
    (h) separating washed sodium chloride solids from the resulting calcium hypochlorite-enriched wash liquor.

2. The process of claim 1 wherein bleach mother liquor from step (d) is used as elutriating fluid in step (b).

3. The process of claim 1 wherein salt mother liquor from step (f) is used as elutriating fluid in step (b).

4. The process of claim 1 or 2 wherein salt mother liquor is recycled to the lowermost stage of the classifier and removed from said zone with said second slurry.

5. The process of claim 1 wherein bleach mother liquor from step (d) and salt mother liquor from step (f) are combined and introduced into the lowermost stage of the classifier.

6. The process of claim 1 wherein the aqueous feed slurry containing calcium hypochlorite particles and larger sodium chloride crystals introduced into the classifier is diluted with an aqueous solution substantially saturated with calcium hypochlorite and sodium chloride.

7. The process of claim 6 wherein the diluting aqueous solution is bleach mother liquor, salt mother liquor or mixtures of such mother liquors.

8. The process of claim 1 wherein the elutriator-classifier has two stages, and the L/D ratio of the upper stage ranges from 2:1 to 15:1, and the L/D ratio of the bottom stage ranges from 5:1 to 40:1.

9. The process of claim 8 wherein the upper stage of said classifier contains an agitator.

10. In the process of producing calcium hypochlorite wherein an aqueous slurry of calcium hypochlorite particles and larger separable sodium chloride crystals is produced and wherein the particles of calcium hypochlorite and crystals of sodium chloride are separated, the improvement which comprises:
    (a) introducing aqueous slurry containing such calcium hypochlorite particles and larger sodium chloride crystals into a two-stage upward flow elutriator-classifier at about its midpoint, the L/D ratio of the upper stage ranging from about 2:1 to about 15:1, and the L/D ratio of the bottom stage ranging from about 5:1 to about 40:1, said aqueous slurry being introduced into said classifier in a manner such that an initial preferential directional flow of said slurry is avoided, the upper stage of said classifier having a larger diameter than the lower stage and the upward fluid velocity in the lower stage being higher than the upward fluid velocity in the upper stage,
    (b) introducing as elutriating fluid bleach mother liquor obtained from step (d) into the lower stage of said classifier,
    (c) removing from the upper stage of said classifier a first slurry in which the solid phase is predominantly calcium hypochlorite particles,
    (d) separating first slurry from step (c) into a wet cake of calcium hypochlorite solids and bleach mother liquor,
    (e) removing from the lower stage of said classifier a second slurry in which the solid phase is predominantly sodium chloride crystals,
    (f) separating said second slurry into a wet cake of sodium chloride solids and salt mother liquor,
    (g) washing said wet cake of sodium chloride solids with an aqueous wash liquor unsaturated in calcium hypchlorite, thereby to dissolve substantially all of the calcium hypochlorite solids present in said wet cake, and
    (h) separating washed sodium chloride solids from the resulting calcium hypochlorite-enriched wash liquor.

11. The process of claim 10 wherein the washed sodium chloride solids contains less than 1 weight percent calcium hypochlorite solids.

12. The process of claim 10 or 11 wherein the wet cake of calcium hypochlorite solids contains less than 5 weight percent of sodium chloride solids.

13. In the process of producing calcium hypochlorite wherein an aqueous slurry of calcium hypochlorite particles and larger separable sodium chloride crystals is produced and wherein the particles of calcium hypochlorite and crystals of sodium chloride are separated, the improvement which comprises:
    (a) introducing aqueous slurry containing such calcium hypochlorite particles and larger sodium chloride crystals into a staged upward flow elutriator-classifier at about the midpoint of such classifier, said aqueous slurry being introduced into said classifier in a manner such that an initial preferential directional flow of said slurry is avoided, the uppermost stage of said classifier having a larger diameter than the lower-most stage and the upward fluid velocity in the lowermost stage being higher than the upward fluid velocity in the uppermost stage, (b) introducing elutriating fluid comprising an aqueous solution substantially saturated with calcium hypochlorite and sodium chloride into the lowermost stage of said classifier, (c) removing a first slurry in which the solid phase is predominantly calcium hypochlorite particles from the uppermost stage of said classifier, and (d) removing from the lowermost stage of said classifier a second slurry in which the solid phase is predominantly sodium chloride crystals.

14. The process of claim 13 wherein the classifier has two stages, the L/D ratio of the upper stage ranging from about 2:1 to about 15:1, and the L/D ratio of the bottom stage ranging from about 5:1 to about 40:1.

15. The process of claim 13 or 14 wherein the first slurry contains less than 5 weight percent of sodium chloride solids.

* * * * *